United States Patent [19]

Chen

[11] Patent Number: 5,361,195

[45] Date of Patent: Nov. 1, 1994

[54] HANGER FOR TUBULAR LAMP IN AN AQUARIUM

[76] Inventor: Shan-Hu Chen, 483, Hsin Shin Road, Tainan, Taiwan, Prov. of China

[21] Appl. No.: 237,251

[22] Filed: May 2, 1994

[51] Int. Cl.⁵ ............................................. F21V 21/08
[52] U.S. Cl. ..................................... 362/397; 362/101
[58] Field of Search ................ 362/397, 101, 253, 217

[56] References Cited

U.S. PATENT DOCUMENTS

| | | | |
|---|---|---|---|
| 1,772,439 | 8/1930 | Garbs | 362/397 |
| 2,002,380 | 5/1935 | Wernicke et al. | 362/397 |
| 2,015,928 | 10/1935 | Goldstein | 362/397 |
| 3,828,176 | 8/1974 | Goldman et al. | 362/397 |

*Primary Examiner*—Richard R. Cole

[57] ABSTRACT

A hanger for a tubular lamp in an aquarium comprising a hanger body having an intermediate square flat vertical portion bored with a center hole and two elastic hooks extending sidewise from the square portion and an opening being formed between an outer end of the two hooks, a cloth brush shaped as the hanger body and fitted around an inner surface of the hanger body, and a sucker having a sidewise post with an annular groove to releasably engage the center hole of the hanger body to combine with the hanger body, the sucker attached on an inner wall of an aquarium, a pair of this hanger used to clamp both ends of a tubular lamp and attached on an inner wall of an aquarium with the suckers.

1 Claim, 3 Drawing Sheets

HANGER FOR TUBULAR LAMP IN AN AQUARIUM

BACKGROUND OF THE INVENTION

A conventional hanger for a tubular lamp, as shown in FIG. 1, generally has a hanger body 11 formed with a sucker 10 as integral and commonly made of rubber. The hanger body 11 has an inner diameter a little smaller than that of a tubular lamp A for catching tightly two ends of the lamp A.

A tubular lamp A may grow moss B on its outer surface after a long period of use, and they have to be cleaned and washed. And the hanger body and the lamp A then have to be separated for cleaning, very inconvenient.

The conventional hanger for a tubular lamp in an aquarium has several disadvantages.

1. The hanger body 11 and the sucker 10 are formed as integral, so the suckers 10 together with the hanger bodies have to be taken off an wall of the aquarium in case of cleaning the lamp A.
2. The hanger body 11 has a little smaller diameter than that of the lamp A, so the lamp A may be not so easily attached with or separated from the hanger body 11.
3. To clean moss B off the lamp A, the lamp A has to be separated from the hanger body 11 with some force.

SUMMARY OF THE INVENTION

An object of this invention is to offer a kind of hanger consisting of a hanger body, a cloth brush fitted and adhered in an inner surface of the hanger body, separably combined with a sucker so that a tubular lamp A can be moved to and fro inside the hanger body to clean moss or dirt off the lamp A after the sucker is removed from an wall of an aquarium in case of need of cleaning the lamp A.

A main feature of this hanger includes a hanger body shaped incompletely circular to have an opening and thus having elasticity for clamping or separating easily from two ends of a tubular lamp, and a cloth brush shaped as the hanger body to fit and be adhered around an inner surface of the hanger body for cleaning the lamp if necessary. Another feature is that the sucker has an engaging post to engage with a center hole provided in an intermediate section of the hanger body so as to easily assemble or disassemble the sucker from the hanger body.

DETAILED DESCRIPTION OF THE INVENTION

Figure 1:
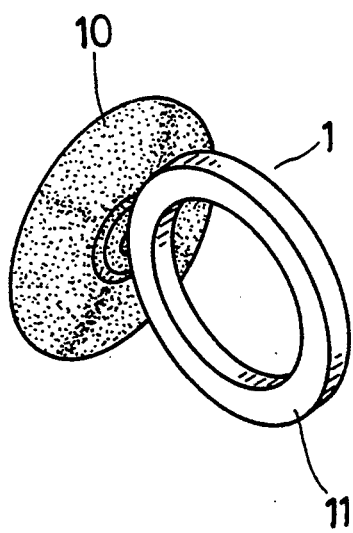
FIG. 1 is a perspective view of a conventional hanger for a tubular lamp in an aquarium.
Figure 2:
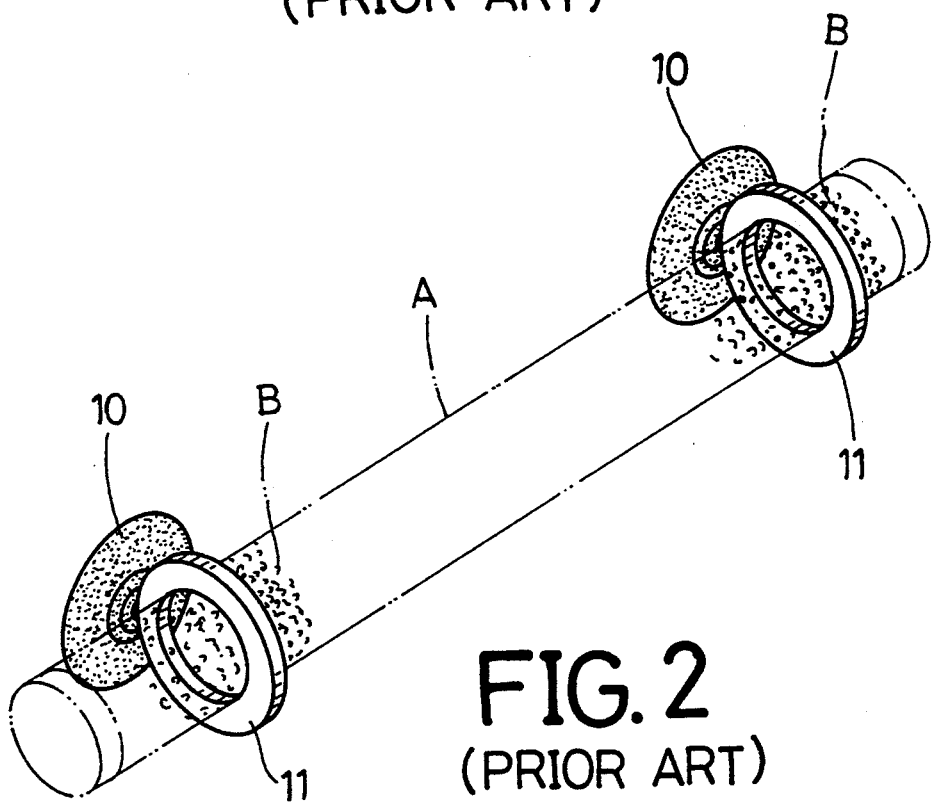
FIG. 2 is a perspective view of a pair of conventional hangers for a tubular lamp in an aquarium being used to hang a tubular lamp.
Figure 3:
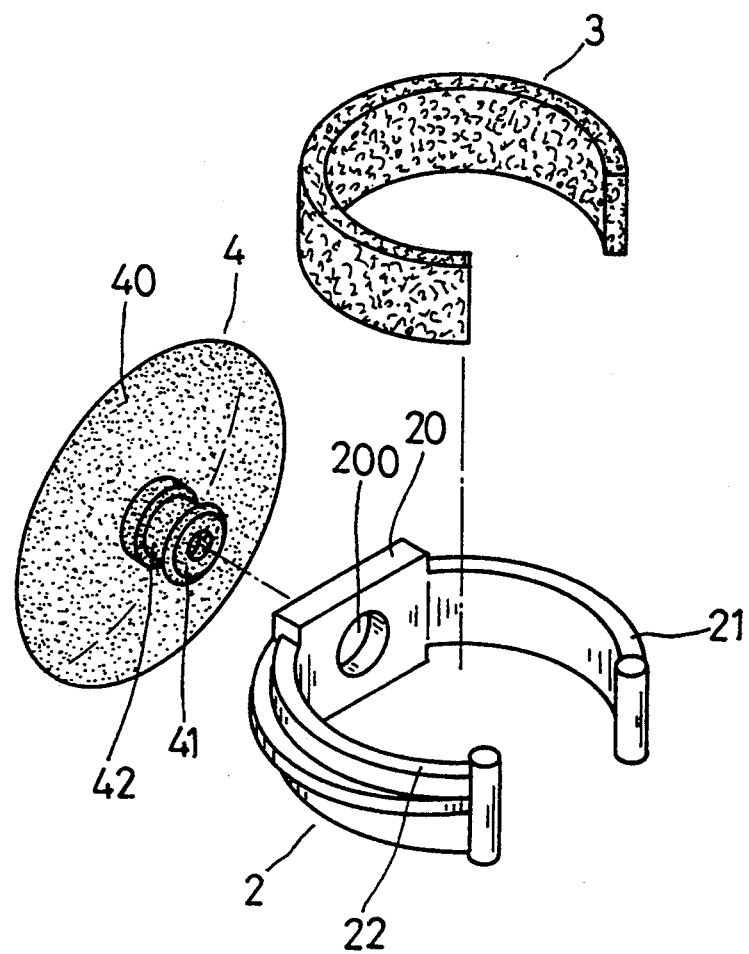
FIG. 3 is an exploded perspective view of a hanger for a tubular lamp in an aquarium in the present invention.

A hanger for a tubular lamp in an aquarium in the present invention, as shown in FIG. 3, comprises a hanger body 2, a cloth brush 3, and a sucker 4 combined together.

The hanger body 2 is shaded as nearly round and with an opening, having an intermediate vertical square flat portion 20, a curved elastic hook 21, 22 respectively provided to extend from the square portion 20 to the right and to the left, and a center round engaging hole 200 bored in the square portion 200.

The cloth brush 3 is shaped almost circular with an opening, fitted and adhered around an inner surface of the hanger body 2.

The sucker 4 is shaped as round and having one side curved inward from an outer edge to the center, having a round post 41 extending sidewise from the center of the other side and having an annular groove 42 to engage with the center hole 200 of the hanger body 2.

Figure 4:
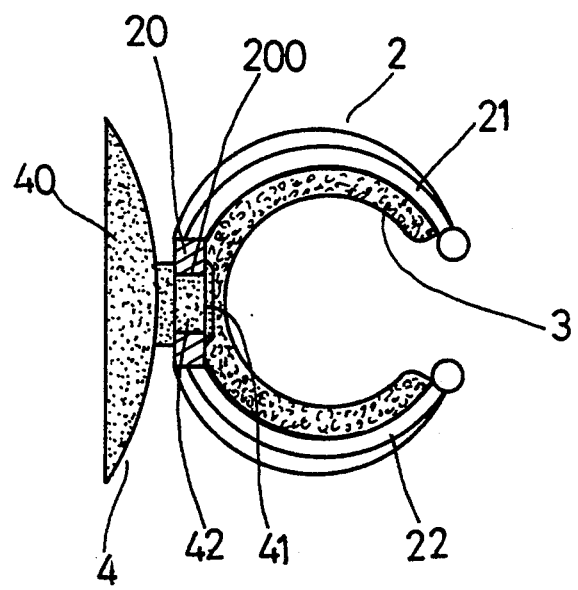
FIG. 4 is a side cross-sectional view of the hanger for a tubular lamp in an aquarium in the present invention.

In assembling, as shown in FIG. 4, first, the cloth brush 3 is adhered on the inner surface of the hanger body 2, then the post 41 is forced to insert in the engaging center hole 200 of the hanger body 2, letting the annular groove 42 engage with the annular surface of the hole 200. Then this hanger is finished in its assemblage.

Figure 5:
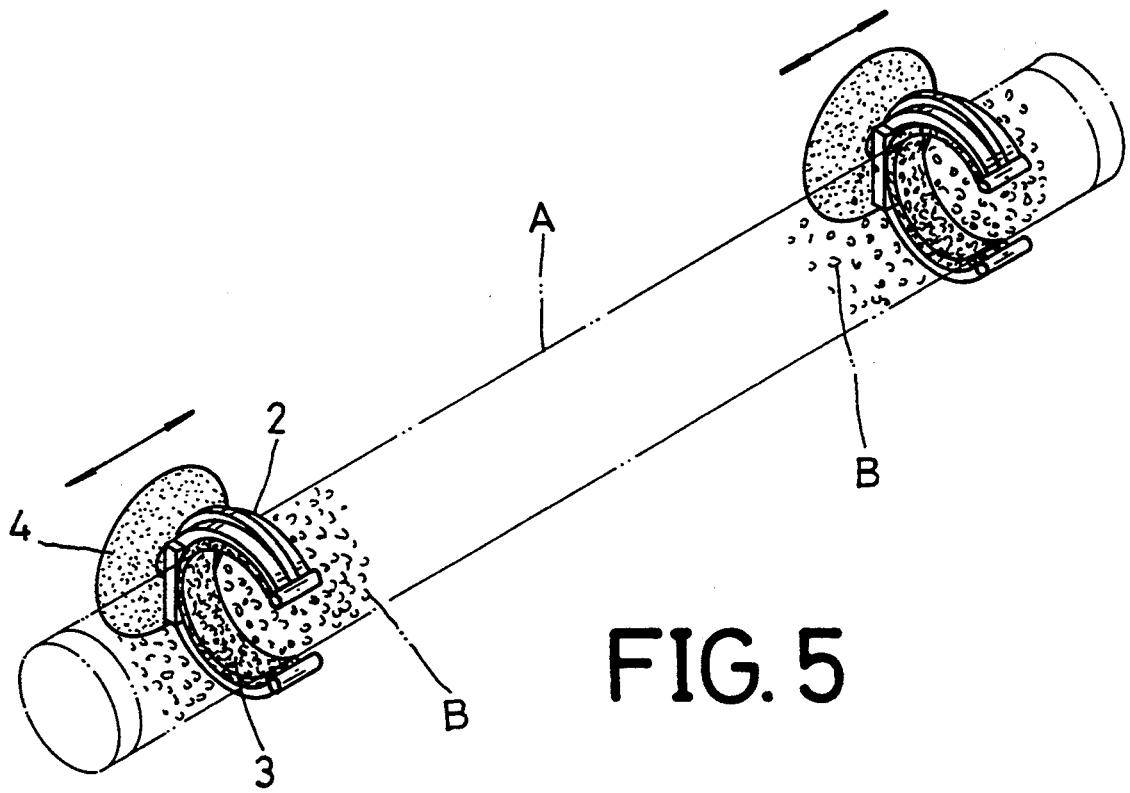
FIG. 5 is a perspective view of the hangers in the present invention used to hang a tubular lamp.

In using, as shown in FIG. 5, both ends of a tubular lamp A are fitted in a pair of the hanger body 2, letting elasticity of the elastic hooks 21, 22 clamping the tubular lamp A, Then the tubular lamp A with the pair of the hangers is carried into an aquarium, letting the two suckers 4, 4 of the hangers compressed to suck an inner wall of the aquarium to keep the tubular lamp A stabilized therein.

If the tubular lamp A gets moss B growing on its substantial length, the pairs of the hanger are taken down by pulling the two suckers 4, 4 off the inner wall of the aquarium. Then the cloth gaskets 3, 3 are used to rub the moss B off the tubular lamp A. After all the moss B is cleaned, the tubular lamp with the pair of the hangers can be again put in the aquarium and be positioned on the inner wall of the aquarium by means of the two suckers 4, 4.

As can be understood from the above mentioned description, this invention is thought to have the following advantages.

1. The hanger body 2 and the sucker 4 is combined together by means of engagement, so they are very easy to clean and wash.
2. The two hooks 21, 22 of the hanger body 2 have elasticity to clamp a tubular lamp.
3. The brush 3 fitted around in the hanger body 2 can be used for brushing moss or dirt on the tubular lamp A, very convenient without need of using a separate brush.

What is claimed is:

1. A hanger for a tubular lamp in an aquarium comprising:

a hanger body shaped as almost circular with an opening, having an intermediate vertical square flat portion bored with a center round engaging hole, a curved long elastic hook extending to a right side and a left side of the square flat portion to form the opening;

a brush made of cloth and shaped as said hanger body and having an opening to correspond to said opening of said hanger body, fitted and adhered around an inner surface of said hanger body;

a sucker shaped round anti having one side sloping inward from an outer edge to the center so as to be attached on a wall by sucking, and a round post provided to extend sidewise from the center of the other side and having an annular groove to engage with said center hole of said hanger body; and a pair of said hangers being used to fit around both ends of a tubular lamp, said suckers of said hangers being attached on an inner wall of an aquarium by sucking or being taken off the wall for cleaning and washing moss or dirt off the tubular lamp by means of said brush.

* * * * *